No. 810,812. PATENTED JAN. 23, 1906.
T. F. ROWLAND.
WELDED SHELL.
APPLICATION FILED OCT. 21, 1903.
Fig. 1,
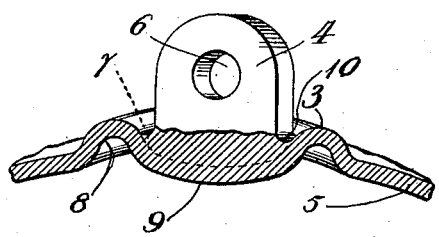
Fig. 2,
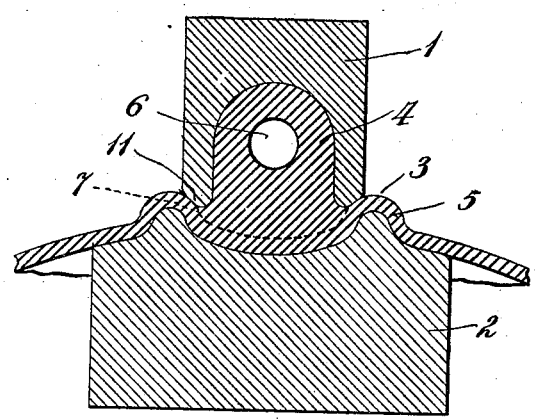
Fig. 3,
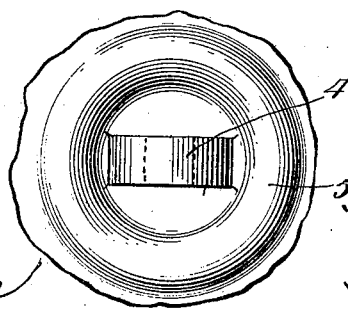
WITNESSES:
INVENTOR
Thomas F. Rowland
BY
Duncan & Duncan
ATTORNEYS.

UNITED STATES PATENT OFFICE.

THOMAS F. ROWLAND, OF NEW YORK, N. Y.

WELDED SHELL.

No. 810,812.     Specification of Letters Patent.     Patented Jan. 23, 1906.

Application filed October 21, 1903. Serial No. 177,921.

*To all whom it may concern:*

Be it known that I, THOMAS F. ROWLAND, a citizen of the United States, and a resident of New York city, in the county and State of New York, have invented certain new and useful Improvements in Welded Shells, of which the following is a specification, taken in connection with the accompanying drawings, which form a part of the same.

This invention relates to welded shells, and relates especially to the method of forming welded attaching-lugs on such shells.

In the accompanying drawings, in which the same reference-numeral refers to similar parts in the several figures, Figure 1 is a sectional view showing an embodiment of this invention. Fig. 2 is a sectional view showing the method of welding the parts. Fig. 3 is a top view of Fig. 1.

Shells such as are adapted for containing vessels, and especially those used for containing fluids under high pressure, are liable to leak in all the joints in the shells and wherever the continuity of the material of which the shell is made is interrupted. It is very advantageous, therefore, that the attaching-lugs or other devices for securing the fittings to such shells be so formed as not to interrupt the continuity of the shell.

In the embodiment of this invention shown in Fig. 1 the shell 5, which may serve as a containing vessel, is indicated as being formed with the rib 3, the metal at this point being forced outward, so as to form the rib and the corresponding groove 8 on the inside of the shell, and at the same time the depression 9 is formed which corresponds with the recess on the outside of the shell within the rib. The attaching-lug is welded to the exterior of the shell within the recess, the outer portion of the lug adjacent the periphery of the same being preferably within the recess and below the level of the projecting rib. As indicated, the lug 4 projects outward from the shell and is formed with a suitable attaching-hole, such as 6, although this form of lug is not necessary in all cases. As is indicated, the peripheral portions 10 of the lug are within the recess in the shell and below the level of the rib 3, a very strong and desirable welded joint being made in this manner, the line of the weld being indicated by the dotted line 7 and the continuity of the shell not being interrupted.

In carrying out this invention the shell is stamped up to form the recess to receive the attaching-lug and also the rib 3 is preferably formed at the same time. The parts are then brought to a welding heat and the weld accomplished under suitable pressure, preferably with the aid of dies, such as 1 and 2, having faces formed to receive the parts, the die 1 being shown formed with the cavity adapted to receive the attaching-lug 4. This die is preferably provided with the die-face 11 about its edge which engages the periphery of the attaching-lug and firmly presses it into engagement with the shell within the recess, so that a good weld is formed in this way. It is of course understood that the lug may be formed and welded to the shell and the attaching-hole 6 subsequently formed, if desired.

While my invention is adapted for use upon small metal vessels formed of light-weight material, it is designed specially for use in heavy work, such as torpedoes or light buoys made of material one-half an inch or so in thickness. In such construction strength and rigidity are essential.

It is of course understood that those familiar with this art may make many modifications in the size, proportions, and number of parts of this device, parts of the same may be used in connection with other devices, and parts may be used without employing all of the same without departing from the spirit of this invention. I do not, therefore, desire to be limited to the details of the disclosure which has been made in this case; but

What I claim as new, and what I desire to secure by Letters Patent, is set forth in the appended claims:

1. In welded shells, a shell formed with a recess and with a projecting rib around the same and a projecting attaching-lug formed with an attaching-hole welded into said recess, the peripheral portions of said lug being within said recess and below the level of said rib and the continuity of said shell being uninterrupted adjacent said lug.

2. In welded shells, a shell formed with a recess, a projecting and attaching lug welded to said shell, the peripheral portions of said lug lying within said recess.

3. In welded shells, a shell formed with a recess and a rigid projecting attaching-lug welded to said shell within said recess.

4. In welded shells, a shell formed with a recess and with a projecting rib around the same and a rigid projecting attaching-lug formed with an attaching-hole welded into said recess, the peripheral portions of said lug being of reduced thickness and being located below the level of said rib and the continuity of said shell being adjacent said lug.

5. In welded shells, a shell formed with a recess, a projecting rib surrounding said recess, said projecting rib extending outward from the surface of the shell, a projecting attaching-lug welded to said shell the welded portion of the lug being within the recess and surrounded by the projecting rib.

6. In welded shells, a shell formed with an irregular contour, such irregularity making a recess in the surface of the shell and a circular rib or projection surrounding the recess and extending outward from a plane of the shell, a rigid attaching-lug welded to said shell within the recess and surrounded by said rib.

THOMAS F. ROWLAND.

Witnesses:
LIDA E. ROWLAND,
JANE E. SMITH.